UNITED STATES PATENT OFFICE.

ALVAH W. ESTABROOK, OF KANSAS CITY, MISSOURI, AND HARRY E. WEAVER, OF KANSAS CITY, KANSAS, ASSIGNORS TO THE LARABEE FLOUR MILLS COMPANY, OF HUTCHINSON, KANSAS, A CORPORATION OF KANSAS.

PROCESS OF MAKING DRY-SHORTENING FLOUR.

1,117,011. Specification of Letters Patent. Patented Nov. 10, 1914.

No Drawing. Application filed June 16, 1913. Serial No. 774,061.

*To all whom it may concern:*

Be it known that we, ALVAH W. ESTABROOK and HARRY E. WEAVER, citizens of the United States, residing, respectively, in Kansas City, in the county of Jackson and State of Missouri, and Kansas City, in the county of Wyandotte and State of Kansas, have invented new and useful Improvements in Processes of Making Dry-Shortening Flour, of which the following is a specification.

Our invention relates to a novel process of preparing a dry shortening flour, and involves as a step in said process the preparation of a dry shortening compound.

One purpose of the invention is to produce a flour which, when made into a dough by the addition of a suitable liquid, as milk or water, is ready for baking and cooking, making it unnecessary to add lard or other fats to the flour, as is usual.

A further purpose of our invention is to mix with the flour two chemically uncombined salts which will chemically react under the application of heat and moisture to set free the fatty, or shortening, substance.

In carying out our invention we take a fatty substance, such, for instance, as stearin, stearic acid, oleo-stearin, oleic acid, or palmitic acid, and after melting the same in a suitable container, mix therewith a substance having an alkaline reaction, such, for instance, as sodium bicarbonate, sodium carbonate, potassium carbonate, sodium hydroxid, or potassium hydroxid, then add water to hasten the reaction. The heating is continued until the chemical reaction is completed. The resulting product will be a stearate, palmitate, or oleate, according to the nature of the fatty substance employed. Preferably we employ stearic acid and chemically combine therewith in the manner stated sodium bicarbonate. The resulting sodium stearate is allowed to cool and then ground to a fine powder. This ground substance is now mixed with a substance having an acid reaction, such as calcium acid phosphate, which, of course, is also ground or powdered, and the compound is now ready to be mixed with the flour. The mixing may be done in any well-known type of mixing machine, such as that commonly employed for making self-raising flour. When the flour is made into a dough and subjected to the action of heat and moisture, a reaction takes place between the calcium acid phosphate and the stearate in which the fatty part of the sodium stearate is released and is free to shorten the mixture.

As illustrations of other substances having an acid reaction which could be used in lieu of the calcium acid phosphate, we would mention among the salts, acid calcium phosphate; acid calcium lactate; and potassium bi-tartrate; and among the acids, citric acid and tartaric acid. These, with the calcium acid phosphate, constitute all of the substances having an acid reaction which now occur to us as being suitable for the purposes of this invention. We wish it to be understood, however, that the above list is not necessarily an exhaustive one, and we claim, as coming within the scope of our invention, the use of any powdered substance having an acid reaction which is suitable for the purposes of the invention: that is, which is edible and which will combine with the base of the salt of the fatty acid employed.

The proportions entering into the composition vary according to the ingredients employed, hence we do not wish to be restricted to any particular proportion. However, when we employ, for example, stearic acid, sodium bicarbonate and calcium acid phosphate to produce the composition, we mix them in approximately the following proportions: stearic acid, 10 pounds, sodium bicarbonate, 3 pounds, calcium acid phosphate, 2½ pounds. The ingredients treated and mixed as specified are sufficient for treating about two hundred pounds of flour.

Our composition may be kept for a considerable period of time without material deterioration, and when mixed with flour in a dry state will remain chemically and physically separate therefrom; that is to say, it will not modify, or itself be modified by, the flour. Hence the composition may be mixed on a large scale with flour and the flour be packed or barreled for commercial purposes.

We wish it understood that by the word "flour" as employed in the specification and claims we refer not only to wheat flour, but as well to the ground product of any edible cereal.

We claim:

1. The herein described process which consists in adding to flour in the dry state a composition in powdered form comprising substances having the property of reacting under the action of heat and moisture to set free a fatty substance, the proportion of the composition to the flour being such that the released fatty substance will act to completely shorten the entire body of flour or any amount taken therefrom.

2. The herein described process which consists in reducing to powdered form a quantity of a salt of a fatty acid sufficient to yield under reaction a shortening amount of the fatty acid, mixing therewith a powdered edible substance having an acid reaction and capable of combining with the base of such salt to liberate the fatty acid, and then mixing the resulting composition with flour.

3. The herein described process which consists in reducing to powdered form a quantity of sodium stearate sufficient to yield under reaction a shortening amount of stearic acid, mixing therewith a powdered edible substance having an acid reaction, and capable of combining with the base of the stearate, and then mixing the resulting composition with flour.

4. The herein described process which consists in reducing to powdered form a quantity of sodium stearate sufficient to yield under reaction a shortening amount of stearic acid, mixing therewith powdered calcium acid phosphate, and then mixing the resulting composition with flour.

5. In the art of producing dry shortening flour the process which comprises melting a shortening amount of a fatty substance, mixing therewith a substance having an alkaline reaction so as to form a salt of a fatty acid, and allowing the product to cool, then powdering the same and combining therewith in powdered form an edible substance having an acid reaction and capable of combining with the base of said salt to liberate the fatty acid thereof.

6. In the art of producing dry shortening flour the process which comprises melting stearic acid and combining therewith sodium bicarbonate, allowing the resulting sodium stearate to cool, and then powdering the same and finally combining therewith in powdered form calcium acid phosphate.

In testimony whereof, we have hereunto set our hands in presence of two subscribing witnesses.

ALVAH W. EASTABROOK.
HARRY E. WEAVER.

Witnesses:
F. G. FISCHER,
L. J. FISCHER.